US010715674B2

(12) United States Patent
Khris

(10) Patent No.: US 10,715,674 B2
(45) Date of Patent: Jul. 14, 2020

(54) METHOD FOR MANAGING THE RECEPTION OF A TELEPHONE CALL ON A CALLED COMMUNICATION TERMINAL

(71) Applicant: ONOFF TELECOM, Paris (FR)

(72) Inventor: Taïg Khris, Paris (FR)

(73) Assignee: ONOFF TELECOM, Paris (FR)

( * ) Notice: Subject to any disclaimer, the term of this patent is extended or adjusted under 35 U.S.C. 154(b) by 0 days.

(21) Appl. No.: 16/092,880

(22) PCT Filed: Apr. 19, 2017

(86) PCT No.: PCT/EP2017/059257
§ 371 (c)(1),
(2) Date: Oct. 11, 2018

(87) PCT Pub. No.: WO2017/182505
PCT Pub. Date: Oct. 26, 2017

(65) Prior Publication Data
US 2019/0141192 A1  May 9, 2019

(30) Foreign Application Priority Data

Apr. 19, 2016  (FR) ..................... 16 53431

(51) Int. Cl.
*H04M 7/00*   (2006.01)
*H04M 3/42*   (2006.01)
(Continued)

(52) U.S. Cl.
CPC ..... *H04M 7/0057* (2013.01); *H04M 1/72597* (2013.01); *H04M 3/42246* (2013.01);
(Continued)

(58) Field of Classification Search
CPC ..... H04M 1/72597; H04M 2203/2011; H04M 2203/558; H04M 2207/187;
(Continued)

(56) References Cited

U.S. PATENT DOCUMENTS 4,878,240 A * 10/1989 Lin ................. H04M 3/42
379/88.22
5,768,358 A * 6/1998 Venier ............. H04M 3/4228
379/221.09

(Continued)

FOREIGN PATENT DOCUMENTS

KR      20040060237 A    7/2004
WO    WO 2012/001016 A1  1/2012

OTHER PUBLICATIONS

Search Report from French Intellectual Property Office on corresponding FR application (FR1653431) dated Dec. 22, 2016.
(Continued)

*Primary Examiner* — Dung B Huynh
(74) *Attorney, Agent, or Firm* — Klein, O'Neill & Singh, LLP

(57) ABSTRACT

The subject of the present invention is a method for managing the reception of a telephone call signal on a communication terminal, with a view to the establishment of a telephone link, said telephone link being established by way of a server, said called communication terminal being able to receive the telephone call signal according to at least two modes, comprising a "voice" mode, in which the telephone link between the called communication terminal and the server is ensured by way of a telephone communication network, and a "data" mode, in which the telephone link between the called communication terminal and the server is ensured by way of a network for data communication according to a "Voice over IP" technology, said method comprising the direct selection, by the user of the method, of the mode of establishment of the telephone link. The method comprising the allocating by a call server of a temporary number to the calling communication terminal.

11 Claims, 2 Drawing Sheets

(51) Int. Cl.
*H04M 1/725* (2006.01)
*H04W 4/00* (2018.01)
*H04M 7/12* (2006.01)

(52) U.S. Cl.
CPC ...... *H04M 3/42289* (2013.01); *H04M 7/1285* (2013.01); *H04M 2203/2011* (2013.01); *H04M 2203/558* (2013.01); *H04M 2207/187* (2013.01); *H04M 2207/20* (2013.01); *H04M 2250/66* (2013.01); *H04W 4/00* (2013.01)

(58) Field of Classification Search
CPC ......... H04M 2207/20; H04M 3/42246; H04M 3/42289; H04M 7/0057; H04M 7/1285; H04M 2207/18–206; H04W 4/00
See application file for complete search history.

(56) References Cited

U.S. PATENT DOCUMENTS

| | | | | |
|---|---|---|---|---|
| 6,215,784 B1* | 4/2001 | Petras | .................. | H04M 7/006 370/356 |
| 6,647,108 B1* | 11/2003 | Wurster | ................ | H04M 3/436 379/201.02 |
| 6,707,891 B1* | 3/2004 | Guedalia | .............. | G06Q 10/107 379/88.13 |
| 6,724,872 B1* | 4/2004 | Moore | ................ | H04M 3/4281 379/142.15 |
| 7,136,466 B1* | 11/2006 | Gao | .................... | H04M 11/062 379/93.23 |
| 7,164,927 B1* | 1/2007 | Koch | .................. | H04M 15/853 455/466 |
| 8,213,587 B2* | 7/2012 | Vendrow | ................ | H04M 3/02 379/201.01 |
| 8,306,201 B1* | 11/2012 | Borislow | .......... | H04M 3/42059 379/142.01 |
| 8,600,391 B2* | 12/2013 | Vendrow | ........... | H04M 3/42374 370/351 |
| 8,798,035 B1* | 8/2014 | Passe | ...................... | H04L 12/66 370/252 |
| 9,848,310 B1* | 12/2017 | Snapp | .................. | H04W 76/50 |
| 10,187,528 B2* | 1/2019 | Kahn | ................... | H04M 3/543 |
| 2001/0036259 A1* | 11/2001 | Larger | .............. | H04M 3/42008 379/211.02 |
| 2002/0118671 A1* | 8/2002 | Staples | ............... | H04L 12/6418 370/352 |
| 2003/0007496 A1* | 1/2003 | Brown | ................ | H04Q 3/0025 370/401 |
| 2003/0016658 A1* | 1/2003 | Creamer | ........... | H04L 29/06027 370/352 |
| 2003/0035530 A1* | 2/2003 | Mansfield | ............. | H04M 1/723 379/219 |
| 2003/0076819 A1* | 4/2003 | Emerson, III | .... | H04L 29/06027 370/352 |
| 2003/0081753 A1* | 5/2003 | Trandal | ............. | H04M 3/42195 379/210.01 |
| 2003/0214940 A1* | 11/2003 | Takken | ............... | H04L 29/06 370/352 |
| 2003/0227939 A1* | 12/2003 | Yukie | ............... | H04M 1/2535 370/465 |
| 2004/0057568 A1* | 3/2004 | Kawabata | ........... | H04M 1/2535 379/220.01 |
| 2004/0235483 A1* | 11/2004 | Sylvain | .................. | H04M 3/54 455/445 |
| 2005/0259636 A1* | 11/2005 | Chun | .................. | H04M 3/40 370/352 |
| 2006/0068767 A1* | 3/2006 | Bhakta | ............... | H04M 3/42178 455/418 |
| 2006/0077957 A1* | 4/2006 | Reddy | ............... | H04M 3/42229 370/352 |
| 2006/0092925 A1* | 5/2006 | Svensson | ................ | H04W 8/06 370/352 |
| 2006/0126806 A1* | 6/2006 | Trandal | ............... | H04M 1/663 379/88.26 |
| 2007/0071216 A1* | 3/2007 | Shen | .................... | H04L 65/1006 379/221.08 |
| 2007/0091878 A1* | 4/2007 | Croak | ............... | H04L 29/06027 370/356 |
| 2007/0092073 A1* | 4/2007 | Olshansky | ........ | H04M 3/42323 379/232 |
| 2007/0121607 A1* | 5/2007 | Gao | ..................... | H04M 11/062 370/356 |
| 2007/0167167 A1* | 7/2007 | Jiang | ................. | H04M 3/548 455/453 |
| 2007/0230374 A1* | 10/2007 | Altberg | ............... | H04M 7/0036 370/271 |
| 2007/0250884 A1* | 10/2007 | Qiu | ....................... | H04M 1/575 725/106 |
| 2008/0013523 A1* | 1/2008 | Nambakkam | ....... | H04M 7/0075 370/352 |
| 2008/0039074 A1* | 2/2008 | Sealey | ................ | H04M 1/2535 455/426.2 |
| 2008/0056235 A1* | 3/2008 | Albina | ................. | H04M 7/123 370/352 |
| 2008/0056474 A1* | 3/2008 | Wang | .................... | H04M 3/436 379/201.01 |
| 2008/0130859 A1* | 6/2008 | McLarty | .............. | H04M 11/00 379/211.02 |
| 2008/0137642 A1* | 6/2008 | Teodosiu | ............ | H04M 3/4931 370/352 |
| 2008/0159261 A1* | 7/2008 | Bessis | ..................... | H04L 12/66 370/352 |
| 2008/0187108 A1* | 8/2008 | Engelke | ................. | G10L 15/265 379/52 |
| 2008/0267377 A1* | 10/2008 | Siegrist | ................. | H04M 7/003 379/201.02 |
| 2009/0003316 A1* | 1/2009 | Lee | ..................... | H04L 12/5692 370/352 |
| 2009/0022103 A1* | 1/2009 | Shatsky | ............... | H04L 65/1083 370/331 |
| 2009/0086954 A1* | 4/2009 | Coppage | ............. | H04M 7/0057 379/220.01 |
| 2009/0116466 A1* | 5/2009 | Lee | ........................ | H04W 8/02 370/338 |
| 2009/0268725 A1* | 10/2009 | Coppage | ............. | H04L 12/5692 370/353 |
| 2009/0268897 A1* | 10/2009 | Coppage | ............. | H04M 7/0057 379/221.01 |
| 2010/0035594 A1* | 2/2010 | Vendrow | ........... | H04M 3/53308 455/417 |
| 2010/0098057 A1* | 4/2010 | Stewart | ................. | H04M 3/465 370/352 |
| 2010/0128857 A1* | 5/2010 | Logan | ............... | H04M 3/42229 379/88.22 |
| 2010/0226362 A1* | 9/2010 | Kim | ....................... | H04L 12/14 370/352 |
| 2010/0227604 A1* | 9/2010 | Hsieh | ..................... | H04L 12/14 455/418 |
| 2010/0251177 A1* | 9/2010 | Geppert | ............. | H04M 1/27475 715/821 |
| 2011/0003585 A1* | 1/2011 | Wang | ..................... | H04W 36/14 455/418 |
| 2011/0033033 A1* | 2/2011 | Koul | ..................... | H04M 3/565 379/202.01 |
| 2011/0044321 A1* | 2/2011 | Rosenberg | .......... | H04M 7/0057 370/352 |
| 2011/0159861 A1* | 6/2011 | Pratt | .................... | H04L 63/0407 455/417 |
| 2011/0261792 A1* | 10/2011 | Oerton | .................... | H04W 88/06 370/335 |
| 2011/0292928 A1* | 12/2011 | Yin | ..................... | H04M 7/0057 370/352 |
| 2012/0106719 A1* | 5/2012 | Hillier | ............... | H04M 3/42008 379/93.02 |
| 2013/0143529 A1* | 6/2013 | Leppanen | ................ | H04W 4/08 455/411 |
| 2013/0201280 A1* | 8/2013 | Shen | ...................... | H04N 7/147 348/14.12 |
| 2013/0259218 A1* | 10/2013 | Borislow | .......... | H04M 3/42059 379/207.13 |

(56) References Cited

U.S. PATENT DOCUMENTS

| | | | | |
|---|---|---|---|---|
| 2013/0325973 A1* | 12/2013 | Chu | H04M 3/42059 | |
| | | | | 709/206 |
| 2013/0339464 A1* | 12/2013 | Goudarzi | H04L 61/1547 | |
| | | | | 709/206 |
| 2014/0241334 A1* | 8/2014 | Martin | H04W 4/90 | |
| | | | | 370/338 |
| 2014/0321417 A1* | 10/2014 | Yang | H04L 65/1046 | |
| | | | | 370/329 |
| 2015/0181031 A1* | 6/2015 | Warnack | H04M 3/42059 | |
| | | | | 370/259 |
| 2015/0201086 A1* | 7/2015 | Abi | H04M 7/006 | |
| | | | | 370/352 |
| 2015/0358476 A1* | 12/2015 | Flores-Estrada | H04M 15/56 | |
| | | | | 370/259 |
| 2016/0086245 A1* | 3/2016 | Tan | G06Q 30/02 | |
| | | | | 705/26.4 |
| 2016/0095141 A1* | 3/2016 | Ma | H04W 76/10 | |
| | | | | 455/416 |

OTHER PUBLICATIONS

International Search Report and Written Opinion on corresponding PCT application (PCT/EP2017/059257) from International Searching Authority (EP) dated Jun. 22, 2017.

* cited by examiner

METHOD FOR MANAGING THE RECEPTION OF A TELEPHONE CALL ON A CALLED COMMUNICATION TERMINAL

TECHNICAL FIELD

Broadly speaking, the invention relates to the field of telecommunications. In particular, the method according to the invention enables the establishment of telephone communications, in particular between two mobile communication terminals that are able to participate in a telephone connection through a telephone communication network, for instance of the GSM type (for "Global System for Mobile Communication", a technology also described as 2G network), of the UMTS type (for "Universal Mobile Telecommunications System", a technology also described as 3G network) or of the LTE type (for "Long Term Evolution", a technology also described as 4G network), and through a data communication network, using the "voice over IP" technology (IP stands for "Internet Protocol", a term well known to any person skilled in the field).

BACKGROUND

According to a well-known process, numerous communication terminals, in particular mobile communication terminals, such as those commonly described with the term "smartphones", are able to establish communications through a telephone communication network and through a data communication network.

However, it often happens that the quality of the telephone communication network does not match that of the data communication network, or that one of the two networks is unavailable.

Intrinsically, the establishment of a voice over IP communication through a data communication network causes a slight deterioration of the signal, owing to the fact that the emitted signal is divided into compressed packets and then reassembled.

To establish a voice over IP communication, using a mobile device, the network coverage must also be sufficient as the technologies used to establish these voice over IP communications use a lot of bandwidth, and typically require several megabits per second.

On the other hand, it also often occurs that the telephone communication network is not available, but internet access, for example through Wi-Fi, is. Typically, when the user is in transit in an airport or staying in a hotel abroad, he/she might have access to a data communication network, but not to a telephone communication network. Inside buildings, it often happens that the telephone communication network is not accessible, whereas the data communication network or internet through a Wi-Fi connection is available.

This situation often stems from a financial decision, as communications through a telephone communication network abroad often give rise to high roaming charges.

These examples, although not comprehensive, show that it can be, depending on the location, the situation and other parameters, preferable for the telephone communication to be established through the telephone communication network ("voice" mode) or through the data communication network ("data" mode using "voice over IP" techniques). It should also be noted that the person calling and the person answering do not necessarily share the same interests.

Therefore, the purpose of the invention is the establishment of telephone communications between two mobile terminals according to a mode selected by the person answering the call, regardless of the mode chosen by the caller, in a transparent manner for said caller.

To partially solve this issue, the state of the art discloses a method for the establishment of a telephone connection that is able to convert a telephone call signal initially emitted by a first communication terminal through a data communication network to a telephone call signal transmitted through a telephone communication network, and received by a second communication terminal through this telephone communication network. According to this method, the first communication terminal stores a communication application of the "voice over IP" type, and a voice over IP server establishes the communication between the first communication terminal and the second communication terminal. More specifically, the voice over IP server is connected to the first communication terminal through the digital communication network, and to the second communication terminal through the telephone communication network. Practically, after reception of the initial signal of a telephone call emitted by the first communication terminal, the server converts the signal into a telephone call signal sent to the second communication terminal through the telephone communication network. When the call signal is accepted by the second terminal, the server connects the two telephone call signals and the communication is established.

However, this solution does not allow the user receiving the call to choose the mode in which to establish the communication, although it might, in certain cases, be preferable to answer either in "voice" mode, or in "data" mode.

For instance, this issue occurs when the first terminal emits a telephone call signal through the telephone communication network, and the user receiving the call prefers or is only able to answer in "data" mode, as he/she only has access to sufficient coverage through the data communication network and not through the telephone communication network.

There is therefore a real need for a method enabling the answering user to choose the communication mode when a telephone call is received by him/her, regardless of the communication network—telephone or data—selected by the caller to emit the telephone call signal.

For this purpose, the present invention relates to a method to manage the reception of a telephone call signal by a called communication terminal, enabling the user of said called communication terminal to select, through a specific action on said terminal, the telephone connection mode.

Therefore, the method according to the invention implements a communication system architecture that comprises a server configured to provide a temporary number associated with the calling communication network, a voice over IP server and an application server configured to notify the user of the service of the existence of a telephone call signal being sent to him/her.

SUMMARY

For this purpose, more specifically, the invention relates to a method for managing the reception of a telephone call signal on a called communication terminal, in particular a called mobile communication terminal, in order to re-establish a telephone connection with a calling communication terminal, in particular a calling mobile communication terminal, said telephone connection being established through at least one server connected to said called communication terminal and to said calling communication terminal, said called communication terminal being configured to receive the telephone call signal according to at least two modes for the establishment of the telephone connection, comprising a "voice" mode, wherein the telephone connection between the called communication terminal and the server is established through a telephone communication network, and a "data" mode, wherein the telephone connection between the called communication terminal and the server is established through a data communication network using "voice over IP" technology, said method further comprising the direct selection, by the user of the method through a specific action on said called communication terminal, of the mode used to establish the telephone connection.

Thanks to the method according to the invention, the user selects the best mode to establish the telephone connection, from the user's perspective, and said connection is established in a transparent manner for the caller, regardless of the communication network—telephone or data—through which the telephone call signal is initially emitted by the calling communication terminal, and regardless of the mode chosen by the user to establish the telephone connection.

In one embodiment, the method according to the invention comprises the following steps, after the emission of an initial telephone call signal from the calling communication terminal through a telephone communication network, towards a number that matches a called communication terminal of a method user:

the reception by a call server of the telephone call signal emitted by the calling communication terminal;

the attribution by the call server of a temporary number to the calling communication terminal;

the notification of the telephone call signal and of the temporary number to a voice over IP server and to an application server, said voice over IP server and application server being connected to the called communication terminal;

the notification of the telephone call signal and of the temporary number sent to the called communication terminal by the application server;

the display on the screen of the called communication terminal of a human-machine interface allowing the user to select the mode in which to establish the telephone connection.

the selection by the user, through said human-machine interface, of the mode in which the telephone connection is established.

In one embodiment, the call server obtains a temporary number from a database containing available temporary numbers.

Advantageously:

if the user chooses to receive the telephone call signal in "voice" mode:

the emission by the called communication terminal of a return telephone call signal sent to the temporary number allocated by the call server to the calling communication terminal, said return telephone call signal being emitted through the telephone communication network;

the reception by the call server of the return telephone call signal;

the reconstitution of the telephone connection, by the call server, by connecting the telephone call signal initially emitted by the calling communication terminal to the return telephone call signal emitted by the called communication terminal;

if the user chooses to receive the telephone call signal in "data" mode:

the emission by the called communication terminal of a return telephone call signal sent to the temporary number allocated by the call server to the calling communication terminal, said return telephone call signal being emitted through the data communication network using the voice over IP server;

the transmission of the return call signal by the voice over IP server to the call server;

the reception by the call server of the return telephone call signal;

the reconstitution of the telephone connection, by the call server, by connecting the telephone call signal initially emitted by the calling communication terminal to the return telephone call signal emitted by the called communication terminal;

In one embodiment, the method according to the invention comprises the following steps, after the emission of an initial telephone call signal from the calling communication terminal through a data communication network, using a voice over IP technology, towards a number that matches a called communication terminal of a method user:

the reception by the voice over IP server of the telephone call signal emitted by the calling communication terminal;

the notification of the telephone call signal sent to the application server;

the attribution by the application server of a temporary number to the calling communication terminal;

the notification of the telephone call signal and of the temporary number sent to the called communication terminal;

the display on the screen of the called communication terminal of a human-machine interface allowing the user to select the mode in which to establish the telephone connection.

the selection by the user, through said human-machine interface, of the mode in which the telephone connection is established.

In this case also, the application server can obtain a temporary number from a database containing available temporary numbers.

Advantageously:

if the user chooses to receive the telephone call signal in "voice" mode, the emission by the called communication terminal of a return telephone call signal sent to the temporary number allocated by the application server to the calling communication terminal, said return telephone call signal being emitted through the telephone communication network;

the reception by the call server of the return telephone call signal;

the transmission of the return telephone call signal through the call server to the voice over IP server;

the reconstitution of the telephone connection, by the voice over IP server, by connecting the telephone call signal initially emitted by the calling communication terminal to the return telephone call signal emitted by the called communication terminal;

if the user chooses to receive the telephone call signal in "data" mode:

the emission by the called communication terminal of a return telephone call signal sent to the temporary number allocated by the call server to the calling communication terminal, said return telephone call signal being emitted through the data communication network using the voice over IP server;

the reconstitution of the telephone connection, by the voice over IP server, by connecting the telephone call signal initially emitted by the calling communication terminal to the return telephone call signal emitted by the called communication terminal;

In one embodiment, the called communication terminal comprises an application configured to receive all telephone call signal notifications sent by the application server, to display said human-machine interface, and to command the emission by said called communication terminal of the return telephone call signal, in "voice" mode or in "data" mode, depending on how the user has chosen to establish the communication mode.

In one embodiment, the initial telephone call signal is emitted, through the telephone communication network, towards a virtual number of the method user, the application server being configured to associate said virtual number with the called communication terminal.

Furthermore, it should be noted that the invention also relates to a communication network system, comprising a call server, a voice over IP server, an application server, a database containing available temporary numbers, a telephone communication network configured to be connected to a calling communication terminal and a called communication terminal, and a data communication network configured to be connected to a calling communication terminal and to a called communication terminal, both being configured to implement the method for managing the reception of a telephone call signal, such as briefly described above.

BRIEF DESCRIPTION OF THE DRAWINGS

The invention is better understood upon reading the following description, provided solely as an example, and with reference to the appended figures, in which.

DETAILED DESCRIPTION

It is worth recalling that the present invention is described below with different non-limiting embodiments and can be implemented in different versions, known to the person skilled in the field, which are also included in the present invention.

In the following description, the term "communication terminal" is used to describe any electronic device, in particular any mobile phone of the "smartphone" type, featuring calculation and data storage means and configured to transmit and receive data through a telephone or data communication network.

Figure 1:
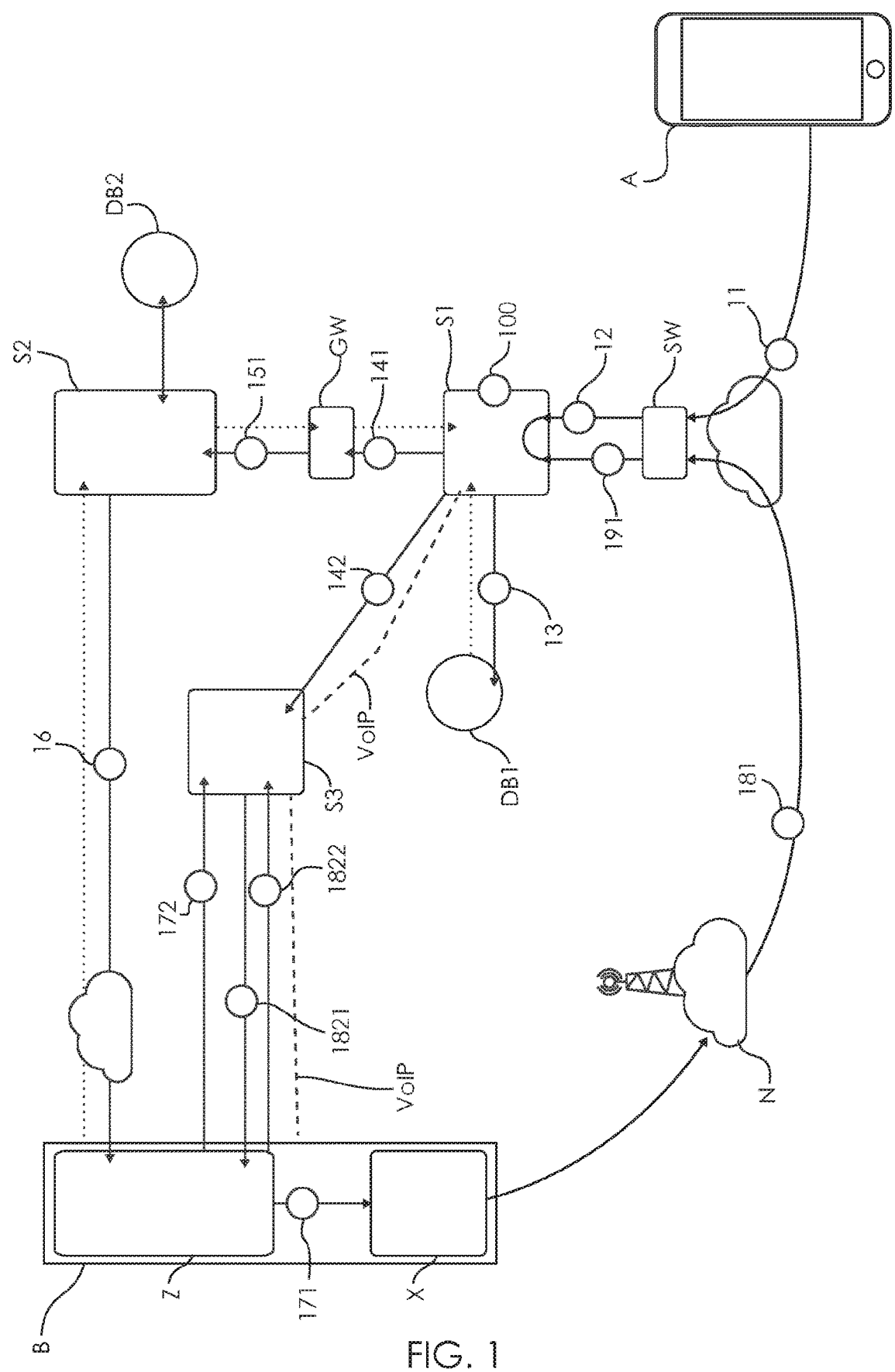
FIG. 1 shows the implementation diagram of the method according to the invention when a caller emits a telephone call signal through the telephone communication network.
Figure 2:
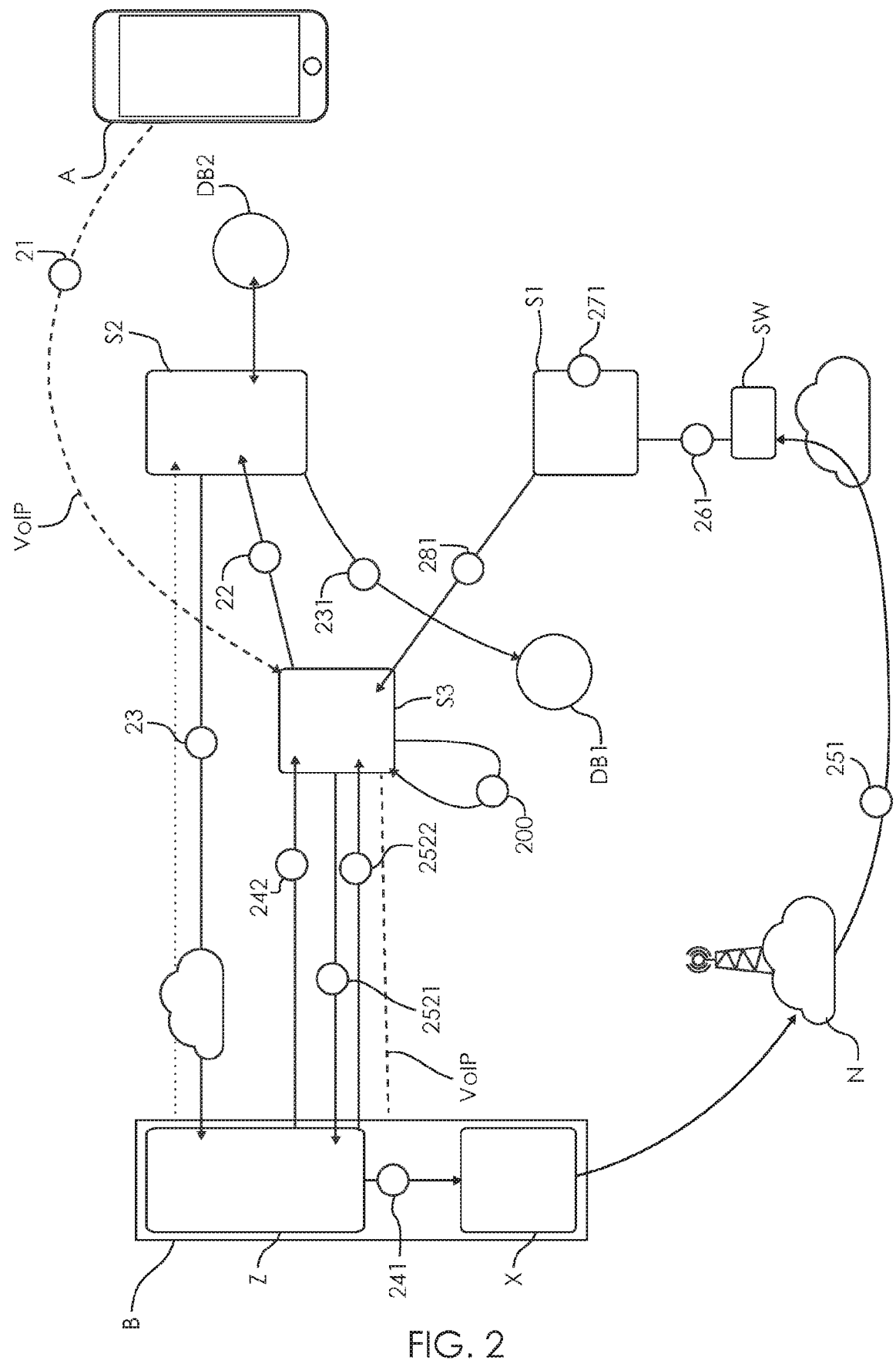
FIG. 2 shows the implementation diagram of the method according to the invention when a caller emits a telephone call signal through the data communication network.

In FIGS. 1 and 2, the communication terminals A and B are, specifically, smartphones connected to a telephone communication network N, and to a data communication network.

It is worth recalling that a telephone communication network N consists in a private or extended communication infrastructure enabling the connection of a plurality of communication devices, such as servers, exchanges, databases and communication terminals. In a known manner, the communication infrastructure of a telephone communication network forms a wire and/or wireless network. In particular, in the context of this invention, the telephone communication network is preferably of the GSM, UMTS, or LTE type.

It is also worth recalling that a data communication network consists in a private or extended communication infrastructure enabling the connection of a plurality of communication devices, such as servers, exchanges, databases or communication terminals, for example. In a known manner, the communication infrastructure of a data communication network forms a wire and/or wireless network. In the context of the present invention, the data communication network is, specifically, a network that complies with the Internet Protocol.

$1^{st}$ Use Case: A Calling Communication Terminal Emits an Initial Telephone Call Signal Through the Telephone Communication Network:

In reference to FIG. 1, a calling communication terminal A tries to connect to the number—or an identifier—of a called user, the telephone call signal being emitted through a telephone communication network N, in other words in "voice" mode. The caller also has a number or an identifier used to connect the calling communication terminal A.

According to the invention, the emitted call signal 11 is directed 12, through a traditional exchange SW, to a call server S1 to place the call signal on hold for a brief moment, of a few milliseconds, during which the call server S1 allocates a temporary number to the calling communication terminal A. In one embodiment, the call server S1 obtains the temporary number by searching through 13 a database DB1 of available temporary numbers.

The call server S1 then sends a notification 141, 142 of the emitted call signal, in parallel, to a voice over IP server S3 and through 151 a gateway GW to an application server S2, by communicating, each time, the temporary number and the actual identifier of the caller and, as necessary, any number of characteristics associated with the emitted call signal.

At that moment, the application server S2 knows the called number. In particular, according to one embodiment, the called number is a virtual number of a service subscriber implementing the method according to the invention. In this embodiment, the application server S2 then accesses a database DB2 through which it can check whether the user matching the called virtual number is in fact a service subscriber and associates the called virtual number with the real number or with an identifier used by the called user to connect to his/her communication terminal, for example through a dedicated application. In one embodiment, the application server S2 also checks whether there are any associated configuration parameters. These configuration parameters relate, for example, to the classification of the called virtual number as a private or work number, or the times at which, for instance, only specific calls must be notified while the others are systematically rejected, etc.

The application server S2 then sends a notification 16 of the telephone call signal emitted by the calling communication terminal to the user associated with the called number, said number potentially being a virtual number, as described above.

On his/her mobile terminal B, the called user, if he/she decides to accept the call signal, has several means to decide how to establish the communication mode.

In one embodiment, the called mobile terminal B features a dedicated application Z that comprises a human-machine interface enabling the user to make his/her choice. For example, a first button enabling to take the call is displayed in the bottom left corner of the screen, whereby the call is taken by establishing the connection through the data communication network, i.e. in "data mode", using a voice over IP technology, whereas a second button enabling to take the call is displayed in the bottom right corner of the screen, whereby the call is taken by establishing the connection through the telephone communication network N, i.e. in "voice mode".

According to another embodiment, the application Z comprises a human-machine interface that displays a sliding bar on the screen when the notification of an emitted call is sent to said application by the application server S2.

In this case, for example, if the user slides the sliding bar to the left, the connection is established through the data communication network, and if the user slides the sliding bar to the right, the connection is established through the telephone communication network N.

According to the invention, when the notification of a telephone call signal 11 initially emitted by a calling communication terminal A is sent to a called communication terminal B, following the steps of the method described above, the user of the called communication terminal B selects, from his/her perspective, how to establish the communication mode. In other words, the called user decides to take the call in "data" mode or in "voice" mode.

Once the way to establish the communication mode is selected by the called user, his/her terminal B emits a call to the caller, according to the selected communication mode, through the call module X of the communication module B.

If the called user has taken the call in "voice" mode, the mobile terminal of the called user B emits a call 181, or more specifically a call back (or a return telephone call) to the temporary number allocated by the call server to the caller, said call back 181 being emitted through the telephone communication network N. Therefore, for example, the dedicated application Z commands 171 the call module X of the communication terminal B to emit the return telephone call 181 through the telephone communication network N.

The call back 181 is directed 191 through a traditional exchange SW towards the call server S1, the latter connecting 100 the initial call signal 11, 12 emitted by the calling communication terminal A to the call back 181, 191 emitted by the called communication terminal, the call server S1 thereby reconstituting the telephone connection by associating the temporary number with the actual identifier of the caller.

If the called user has taken the call in "data" mode, the called communication terminal B of the user contacts 172 the voice over IP server S3 through the dedicated application Z, for example. The voice over IP server S3 then sends a request 1821 to the called communication terminal B. The called communication terminal B, for instance through the dedicated application Z, validates the request 1822 to establish the voice over IP (VoIP) communication.

The voice over IP communication is transmitted by the voice over IP server S3 to the call server S2, and the latter connects 100 the initial telephone call signal 11, 12 emitted by the calling communication terminal A to the voice over IP (VoIP) call back emitted by the called communication terminal A, the call server S1 thereby reconstituting the telephone connection.

2$^{nd}$ Use Case: A Calling Communication Terminal Emits an Initial Telephone Call Signal Through the Data Communication Network, Using the Voice Over IP Mode:

FIG. 2 shows a second scenario for the implementation of the method according to the invention. In this case, the caller emits 21, from his/her communication terminal A, a call signal to a number or an identifier of a user of the method through the data communication network. In other words, the caller emits, from an identifier specific to the caller, a call in voice over IP (VoIP) to reach said user.

This emitted VoIP telephone call signal is directly received by the voice over IP server S3. The voice over IP server sends 22 a notification of the call signal and its characteristics to the application server S2. As described above, in one embodiment, the application server S2 searches through a database DB2 to access the configuration parameters associated with the called number, in order to determine, for example, whether the called user is a service subscriber, and to take into account all the characteristics of the number. In particular, the called number can be a virtual number associated with configuration parameters such as those described as an example in the 1$^{st}$ use case.

Furthermore, the application server S2 obtains the temporary number associated with the identifier of the caller. In one embodiment, the application server S2 obtains the temporary number by searching through 231 a database DB1 containing available temporary numbers.

The application server S2 then sends a notification 23 of the call signal and its characteristics to the called user, who receives the corresponding notification on his/her communication terminal B, for example through the dedicated application Z.

As in the first use case described with reference to FIG. 1, the user chooses, if he/she accepts the call, how to establish the communication mode.

If the called user takes the call in "voice" mode, the communication terminal B of the called user emits a call 251, or more specifically a call back (or a return telephone call) to the temporary number allocated by the application server S2 to the caller, said call back being emitted through the telephone communication network N. Therefore, for example, the dedicated application Z commands 241 the call module X of the communication terminal B to emit the return telephone call 251 through the telephone communication network N.

The call back 251 is directed 261, through a traditional exchange SW, towards the call server S1 that receives 271 said call back and transmits 281 it to the voice over IP server S3, where the communication is reconstituted 200, by the voice over IP server S3 that connects the initial VoIP telephone call signal emitted to the calling communication terminal to the call back 251 emitted by the called communication terminal B.

If the called user takes the call in "data" mode, the communication terminal B of the user contacts 242 the voice over IP server S3 through the dedicated application Z for example. The voice over IP server S3 then sends a request 2521 to the called communication terminal B. The called communication terminal B, for instance through the dedicated application Z, validates 2522 the request to establish the voice over IP (VoIP) communication.

Therefore, the call back is emitted through the data communication network, via the voice over IP server S3, and the reconstitution 200 of the telephone connection is conducted by the voice over IP server S3, by connecting the VoIP telephone call signal initially emitted by the calling communication terminal A to the return VoIP telephone call signal emitted by the called communication terminal B.

Therefore, thanks to the method of the invention, a user implementing the method according to the invention can choose to accept a call in "voice" mode or in "data" mode, regardless of the mode used to emit the call signal. The called user can therefore accept, in "voice" mode, a call emitted through a data communication network and the user can also accept, in "data" mode a call emitted through a telephone communication network.

The establishment of the communication is achieved without the inconveniences of a traditional "call back", which implies the interruption of the communication before a "call back" is sent from the called user to the caller. According to the invention, the communication is reconstituted by reconnection, without interruption, by associating a temporary number to the caller. Depending on the case, the reconnection is conducted by the call server or by the voice over IP server, without causing any disruptions to the caller.

Similarly, when the initial telephone call signal is emitted through the telephone communication network, the established telephone connection is routed by the telephone communication network from the calling mobile terminal to the call server.

On the other side, the telephone connection established between the called communication terminal and the call server is routed, either by the telephone communication network or by the data communication network, depending on how the method user chooses to establish the communication mode.

In parallel, when the initial telephone call signal is emitted through the data communication network, i.e. in voice over IP mode, the established telephone connection is routed by the data communication network from the calling mobile terminal to the voice over IP server.

On the other side, the telephone connection established between the called communication terminal and the voice over IP server is routed, either by the telephone communication network, through the call server or by the data communication network, depending on how the method user chooses to establish the communication mode.

In order to implement this method, the present invention also relates to a dedicated communication infrastructure that comprises a SW exchange, a call server S1, a database hosting the temporary DB1 numbers, a voice over IP server S3 and an application server S2 that comprises, as necessary, a database DB2 hosting the configuration parameters associated to the users who have subscribed to the service.

The invention claimed is:

1. A method for managing the reception of a telephone call signal on a called communication terminal, in particular a called mobile communication terminal, in order to establish a telephone connection with a calling communication terminal, in particular a calling mobile communication terminal, said method comprising:
configuring said called communication terminal to receive the telephone call signal according to at least two modes for the establishment of the telephone connection, wherein the at least two modes comprise a "voice" mode, wherein the telephone connection between the called communication terminal and at least one server is established through a telephone communication network, and a "data" mode, wherein the telephone connection between the called communication terminal and the at least one server is established through a data communication network using "voice over IP" technology;
directly selecting, by a user of the method through a specific action on said called communication terminal, the mode used to establish the telephone connection;
establishing said telephone connection using the selected mode through the at least one server connected to said called communication terminal and to said calling communication terminal;
after an emission of an initial telephone call signal from the calling communication terminal on a telephone communication network, towards a number matching a called communication terminal of a user of the method:
receiving, by a call server, the telephone call signal emitted by the calling communication terminal;
attributing, by the call server, a temporary number to the calling communication terminal;
sending a notification of the telephone call signal and of the temporary number to a voice over IP server and to an application server, said voice over IP server and application server being connected to the called communication terminal;
sending a notification of the telephone call signal and of the temporary number to the called communication terminal by the application server;
displaying, on the screen of the called communication terminal, a human-machine interface allowing the user to select the mode in which to establish the telephone connection;
selecting, by the user, through said human-machine interface, the mode in which the telephone connection is established;
if the user chooses to receive the telephone call signal in "voice" mode:
emitting, by the called communication terminal, a return telephone call signal sent to the temporary number allocated by the call server to the calling communication terminal, said return telephone call signal being emitted through the telephone communication network;
receiving, by the call server, the return telephone call signal;
reconstituting the telephone connection, by the call server, by connecting the telephone call signal initially emitted by the calling communication terminal to the return telephone call signal emitted by the called communication terminal; and
in response to the user choosing to receive the telephone call signal in "data" mode;
emitting, by the called communication terminal, a return telephone call signal sent to the temporary number allocated by the call server to the calling communication terminal, said return telephone call signal being emitted through the data communication network using the voice over IP server;
transmitting the return call signal by the voice over IP server to the call server;
receiving, by the call server, the return telephone call signal;
reconstituting the telephone connection, by the call server, by connecting the telephone call signal initially emitted by the calling communication terminal to the return telephone call signal emitted by the called communication terminal.

2. The method of claim 1, wherein the call server obtains a temporary number from a database containing available temporary numbers.

3. The method of claim 1, wherein the called communication terminal comprises an application configured to receive all telephone call signal notifications sent by the application server, to display said human-machine interface, and to command the emission by said called communication terminal of the return telephone call signal, in "voice" mode or in "data" mode, depending on how the user has chosen to establish the communication mode.

4. The method of claim 1, wherein the initial telephone call signal is emitted, through the telephone communication network, towards a virtual number of the method user, the application server being configured to associate said virtual number with the called communication terminal.

5. A method for managing the reception of a telephone call signal on a called communication terminal, in particular a called mobile communication terminal, in order to establish a telephone connection with a calling communication terminal, in particular a calling mobile communication terminal, said method comprising:
configuring said called communication terminal to receive the telephone call signal according to at least two modes for the establishment of the telephone connection, wherein the at least two modes comprise a "voice" mode, wherein the telephone connection between the called communication terminal and at least one server is established through a telephone communication network, and a "data" mode, wherein the telephone connection between the called communication terminal and the at least one server is established through a data communication network using "voice over IP" technology;
directly selecting, by a user of the method through a specific action on said called communication terminal, the mode used to establish the telephone connection;
establishing said telephone connection using the selected mode through the at least one server connected to said called communication terminal and to said calling communication terminal;
after an emission of an initial telephone call signal from the calling communication terminal on a telephone communication network, towards a number matching a called communication terminal of a user of the method:
receiving, by a call server, the telephone call signal emitted by the calling communication terminal;
attributing, by the call server, a temporary number to the calling communication terminal;
sending a notification of the telephone call signal and of the temporary number to a voice over IP server and to an application server, said voice over IP server and application server being connected to the called communication terminal;
sending a notification of the telephone call signal and of the temporary number to the called communication terminal by the application server;
displaying, on the screen of the called communication terminal, a human-machine interface allowing the user to select the mode in which to establish the telephone connection;
selecting, by the user, through said human-machine interface, the mode in which the telephone connection is established;
after emitting an initial telephone call signal from the calling communication terminal through a data communication network, using a voice over IP technology towards a number that matches a called communication terminal of a method user;
receiving, by the voice over IP server, the telephone call signal emitted by the calling communication terminal;
sending a notification of the telephone call signal sent to the application server;
attributing, by the application server, a temporary number to the calling communication terminal;
sending a notification of the telephone call signal and of the temporary number sent to the called communication terminal;
displaying on the screen the called communication terminal of a human-machine interface allowing the user to select the mode in which to establish the telephone connection;
selecting, by the user, through said human-machine interface, how to establish the telephone connection.

6. The method of claim 5, wherein the application server obtains a temporary number by searching through a database containing available temporary numbers.

7. The method of claim 5, further comprising:
if the user chooses to receive the telephone call signal in "voice" mode:
emitting, by the called communication terminal, a return telephone call signal sent to the temporary number allocated by the application server to the calling communication terminal, said return telephone call signal being emitted through the telephone communication network;
receiving, by the call server, the return telephone call signal;
sending a transmission of the return telephone call signal by the call server to the voice over IP server;
reconstituting the telephone connection, by the voice over IP server, by connecting the telephone call signal initially emitted by the calling communication terminal to the return telephone call signal emitted by the called communication terminal; and
in response to the user choosing to receive the telephone call signal in "data" mode:
emitting, by the called communication terminal, a return telephone call signal sent to the temporary number allocated by the call server to the calling communication terminal, said return telephone call signal being emitted through the data communication network using the voice over IP server;
reconstituting the telephone connection, by the voice over IP server, by connecting the telephone call signal initially emitted by the calling communication terminal to the return telephone call signal emitted by the called communication terminal.

8. The method of claim 5, wherein the call server obtains a temporary number from a database containing available temporary numbers.

9. The method according to claim 5, wherein the called communication terminal comprises an application configured to receive all telephone call signal notifications sent by the application server, to display said human-machine interface, and to command the emission by said called communication terminal of the return telephone call signal, in "voice" mode or in "data" mode, depending on how the user has chosen to establish the communication mode.

10. The method according to claim 5, wherein the initial telephone call signal is emitted, through the telephone communication network, towards a virtual number of the method user, the application server being configured to associate said virtual number with the called communication terminal.

11. A communications network system, comprising:
a call server;
a voice over IP server;
an application server;
a database containing available temporary numbers;
a telephone communication network configured to be connected to a calling communication terminal and a called communication terminal; and a data communication network configured to be connected to a calling communication terminal and to a called communication terminal, wherein the communications network system is configured to implement the method according to claim 1.

\* \* \* \* \*